Patented Jan. 10, 1939

2,143,651

UNITED STATES PATENT OFFICE 2,143,651

FOOD SPREAD BASE

Arthur K. Fisher, La Grange, and Lawrence F. Culkin, Chicago, Ill.

No Drawing. Application May 4, 1938, Serial No. 205,986

3 Claims. (Cl. 99—123)

The present invention relates to a base for making a spread for food such as bread, cake, and other similar articles of food, and as for shortening for baking and frying, and the art of producing such a base. This application is a continuation-in-part of our co-pending application Serial No. 117,560, filed December 24, 1936.

Among the objects of the present invention is to provide a novel composition of matter which may be used as a base to mix with a given amount of fat or shortening for producing an edible product, such as a spread, for an article of food. The step of mixing the base and fat or shortening to form a homogeneous composition may be quickly and easily accomplished by the housewife in her kitchen.

The base of this invention is preferably a free flowing liquid of medium viscosity in the form of a fluid emulsion having aqueous and oleaginous components and containing sufficient salt to produce a palatable taste in the desired final product. Such a base in accordance with the present invention is preferably characterized by the following qualifications:

1. It should be capable of ready emulsifiability with a fat in solid or non-flowing condition, such as shortenings in use today, and 2. It should be capable of carrying up to approximately twenty-three per cent of an electrolyte such as common salt in solution without "breaking" for extending periods of time.

With regard to the first qualification, it is generally known that an aqueous phase, and especially an aqueous phase carrying an electrolyte such as sodium chloride or common salt in such concentration in solution, cannot be readily dispersed in a fat in a solid or non-flowing condition.

Also, it is a matter of common knowledge that often, in the breaking of undesirable industrial emulsions, the addition of common salt is resorted to, which, when present in sufficient concentration, "salts out" the stabilizing film surrounding the emulsion globules. The general principle underlying "salting out" of emulsions is that the added re-agent must be soluble in the external phase or more easily wetted by it so as to be able to influence the properties of the stabilizing film. Then by the addition of the suitable electrolyte, the charge on the water globule is neutralized and coalescence results.

These facts are noteworthy in view of the fact that the base to which we have reference carries in the emulsion in a liquid and free flowing condition up to approximately twenty-three per cent common salt without "breaking" for extended periods of time.

We have discovered that both of these requisites, namely, ready emulsifiability with fat or shortening in solid or non-flowing condition and ability to carry approximately twenty-three per cent sodium chloride or common salt in emulsion, can be fulfilled by the use of an oleaginous phase and stabilization of the ensuing emulsion with a relatively small percentage of water soluble vegetable gum.

The incorporation of an oil phase, that is, the preparation of an emulsion in the base itself, enhances the ready dispersion of the base in a solid or non-flowing fat or shortening even when the amount of oil used in the base emulsion is very low, for example, under ten per cent. Any of the edible animal or vegetable fats commonly used such as corn, cotton, soya, etc., may be employed in the preparation of the emulsion.

However, no such emulsion of liquid oil and water in the proportions mentioned is, at present and to our knowledge, possible in the presence of substantially twenty-three per cent electrolyte such as sodium chloride. We have found that this emulsion, even while containing such high percentages of electrolyte, can be stabilized by the addition of a relatively small percentage of an hydrophilic colloid such as a water soluble vegetable gum.

The disperse or oleaginous phase of the emulsion can be composed of relatively small percentages of animal or vegetable triglycerides or fatty acid esters of polyhydroxy alcohols as monostearine or diglycol stearate, or aminophosphatides, as lecithin, or sulfonated (sulfated) higher alcohols, or mixtures thereof, in place of animal or vegetable triglycerides, without departing from the invention.

The agents which may be employed in the stabilization of the emulsion containing salt belong to the group of higher carbohydrates or water soluble vegetable gums having the properties of hydrophilic colloids and among which are included tragacanth, an incision product from Asiatic low spiny shrubs of the genus Astralgus, and tragon obtained by extraction of the endosperm of the carob bean (*Ceratonia siliqua*) and Karaya gum, but not including starches as corn, beet, rice, or the like.

In the preparation of the base mix, we have found that the proportions of the ingredients entering into the novel base may vary within the following approximate limits:

| | Per cent |
|---|---|
| Oleaginous or disperse phase | .5–15 |
| Salt | 7.5–23.0 |
| Moisture (water or milk) | 63.3–85.6 |
| Water soluble vegetable gum or carbohydrate | .35– 2.0 |

The composition of the finished product may vary within substantially the following limits:

| | Per cent |
|---|---|
| Fat | 60.0–85 |
| Salt | .5– 4 |
| Moisture | 11.0–40 |

As an illustrative example, excellent results have been secured by preparing the novel base of the following ingredients and in substantially the following proportions:

| | Per cent |
|---|---|
| Fat or vegetable oil | 7.9 |
| Salt | 13.2 |
| Moisture | 78.4 |
| Water soluble vegetable gum or carbohydrate | .5 |
| | 100.0 |

Four ounces of this novel base, when mixed with twelve ounces of a fat or shortening, makes a finished or resultant product having approximately the following composition:

| | Per cent |
|---|---|
| Fat | 78.7 |
| Salt | 2.8 |
| Moisture | 18.0 |
| Water soluble vegetable gum or carbohydrate (ppt. by alc.) | .5 |
| | 100.0 |

If a final product lower in fat content were desired as, for example—

| | Per cent |
|---|---|
| Fat | 60 |
| Salt | 3 |
| Moisture | 37 | a base mix of approximately the following composition is preferably employed:

| | Per cent |
|---|---|
| Fat or vegetable oil | 6.1 |
| Salt | 7.5 |
| Moisture | 85.6 |
| Water soluble vegetable gum or carbohydrate | .80 |
| | 100.0 | and approximately eleven ounces of shortening used per substantially five ounces of the base.

If a finished product having higher fatty content is desired, say, of approximately the following percentage composition:

| | Per cent |
|---|---|
| Fat | 85.0 |
| Salt | 3.5 |
| Moisture | 11.5 |
| | 100.0 | then the base is preferably composed substantially as follows:

| | Per cent |
|---|---|
| Fat or vegetable oil | 12.4 |
| Salt | 23.0 |
| Moisture | 63.8 |
| Water soluble vegetable gum or carbohydrate | .8 |
| | 100.0 | and three ounces of this base, when mixed with eleven ounces of a fat or shortening, forms a resultant product or spread of delicious flavor and high food value.

As an illustrative example of a base in which an oleaginous substance, containing more hydrophilic groups than the triglycerides of the above examples, constitutes the oil phase of the emulsion, we have secured excellent results by the use of the following ingredients in substantially the following proportions:

| | Per cent |
|---|---|
| Diglycol stearate | 1.33 |
| Salt | 14.00 |
| Moisture | 84.00 |
| Water soluble vegetable gum or carbohydrate | .67 |
| | 100.00 |

It will be appreciated from the above disclosure, that the salt content of the base emulsion varies in general inversely as the amount of base added.

The term "fat" is generically used herein and comprehends vegetable oils and animal fats suitable for the purpose.

The moisture content is determined by such factors as composition of the desired final product and the term "moisture" is used to comprehend either water or milk.

The oleaginous or disperse phase may vary in amount between approximately .5% and 15.0%, depending upon the hydrophilic characteristics of the particular lipin employed. This oil phase is high in the case triglycerides are employed and low when more water soluble substances such as diglycerides are used.

The proportion of hydrophilic colloid, consisting of higher carbohydrates or water soluble gum, fluctuates between approximately .35% and 2%, the concentration being influenced by the amount of electrolyte which the base must carry in solution.

To the above examples may be added the desired flavoring substances, coloring matter and vitamin concentrates, such as vitamin A and/or D.

While we have given by way of illustration certain rather specific examples and approximate proportions of ingredients employed, it is to be understood that the invention is not limited thereto but comprehends other proportions, ingredients and features without departing from the spirit of the invention.

Having thus disclosed the invention, we claim:

1. A stable, fluid food spread base for use in producing an edible food product when mixed with a fat, comprising an emulsion containing an aqueous phase, a disperse phase for facilitating admixture with the fat, salt and a water soluble vegetable gum of the class consisting of tragon and tragacanth for stabilizing the resultant emulsion, said ingredients being in approximately the relative proportions of 63.3% to 85.6% of the aqueous phase, .5% to 15% of the disperse phase, 7.5% to 23% of salt and .35% to 2% of the water soluble gum.

2. A stable, fluid food spread base for use in producing an edible food product when mixed with a fat in solid or non-flowing condition, comprising an intimate mixture of an aqueous phase, an oleaginous phase for facilitating admixture with the solid or non-flowing fat, salt and a water soluble vegetable gum of the class consisting of tragon and tragacanth in approximately the relative proportions of 63.3% to 85.6% of the aqueous phase, .5% to 15% of the oleaginous phase, 7.5% to 23% of salt and .35% to 2% of water soluble vegetable gum.

3. A stable, fluid food spread base for use in producing an edible food product when mixed with a fat, comprising an emulsion including an aqueous phase, an oleaginous disperse phase for facilitating admixture with the fat, salt and a water soluble gum of the class consisting of tragon and tragacanth in approximately the proportions of 78.4% of the aqueous phase, 7.9% of the oleaginous phase, 13.2% of salt, and .5% of the water soluble gum for stabilizing the resultant emulsion.

ARTHUR K. FISHER.
LAWRENCE F. CULKIN.